(12) United States Patent
Thatikonda et al.

(10) Patent No.: US 11,681,522 B2
(45) Date of Patent: Jun. 20, 2023

(54) SELF-HEALING BUILD PIPELINES FOR AN APPLICATION BUILD PROCESS ACROSS DISTRIBUTED COMPUTER PLATFORMS

(71) Applicant: salesforce.com, Inc., San Francisco, CA (US)

(72) Inventors: Kalyan Chakravarthy Thatikonda, San Francisco, CA (US); Prabhjot Singh, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 13 days.

(21) Appl. No.: 17/507,652

(22) Filed: Oct. 21, 2021

(65) Prior Publication Data
US 2023/0129453 A1   Apr. 27, 2023

(51) Int. Cl.
*G06F 9/44* (2018.01)
*G06F 8/71* (2018.01)
*G06F 9/54* (2006.01)

(52) U.S. Cl.
CPC ............... *G06F 8/71* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

*Primary Examiner* — Wei Y Zhen
*Assistant Examiner* — Lanny N Ung
(74) *Attorney, Agent, or Firm* — Schwabe Williamson & Wyatt

(57) ABSTRACT

A self-healing build pipeline architecture for a software application build job across a distributed computer platform comprises a public API that receives configuration data describing the build job, stores the configuration data in a decentralized database, serves requests to/from a pipeline tracker API, and stores states of build pipelines during the build job. The decentralized database stores the configuration data and a project identifier for the build, and metadata regarding states of the build pipelines collected across the distributed computer platform. The pipeline tracker API runs local to the build environment in the distributed computer platform and sends a build status to public API for updating the decentralized database. For any failures in any of the build pipelines, the state is retrieved from the decentralize database and a new build pipeline is triggered locally that resumes from the failed state to provide a self-healing build pipeline architecture.

20 Claims, 8 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,827,446 B2 * | 11/2010 | Kimura ............... G06F 11/076 714/48 |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,354,865 B2 | 5/2016 | Fiebig et al. |
| 10,282,175 B2 | 5/2019 | Busjaeger |
| 10,481,898 B2 | 11/2019 | Advani et al. |
| 10,606,576 B1 | 3/2020 | Tung et al. |
| 10,616,230 B2 | 4/2020 | Singh et al. |
| 10,616,352 B2 | 4/2020 | Elangovan et al. |
| 10,909,118 B2 | 2/2021 | Salva et al. |
| 10,971,159 B2 | 4/2021 | Singh |
| 11,089,026 B2 | 8/2021 | Singh |
| 11,288,061 B1 * | 3/2022 | Johnson ................... G06F 8/51 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0100945 A1* | 4/2015 | Nadar ............... G06F 8/40 717/121 |
| 2018/0052762 A1* | 2/2018 | Vyas ............... G06F 11/3668 |
| 2019/0155938 A1 | 5/2019 | Kudriavtsev et al. |
| 2020/0356980 A1 | 11/2020 | Singh et al. |
| 2021/0036862 A1 | 2/2021 | Kannan et al. |
| 2021/0233045 A1 | 7/2021 | Singh et al. |
| 2021/0234669 A1 | 7/2021 | Singh et al. |

* cited by examiner

Decentralized Database 400

| Project ID 402 | Datamap ID 404 | Build Job 406 | Pipeline ID 408 | Pipeline Status 410 | Distributed Environment 412 | Retry Limit 414 | Pipeline Exec. Time 416 | Project Name 418 | Submission ID 420 | Artifact Repository 422 |
|---|---|---|---|---|---|---|---|---|---|---|
| 1 | dID001 | Apache | 002 | Success | AWS | 3 | 15m | Apache | pSID01 | Nexus |
| 2 | dID002 | Tomcat | 004 | Retry Exhaust | GCP | 3 | 25m | Tomcat | pSID02 | Nexus |
| 2 | dID002 | Tomcat | 004 | Retry Exhaust | AWS | 3 |  | Tomcat | pSID02 | Nexus |
| 2 | dID002 | Tomcat | 004 | Success | AWS | 3 | 15m | Tomcat | pSID02 | Nexus |

```
Distributed Environment:
   AWS:
      AZ0: "0"
      AZ1: "1"
      AZ2: "2"
      Name: Oregon
      NumAZs: "3"
   GCP:
      AZ0: "0"
      AZ1: "1"
      AZ2: "2"
      Name: Oregon
      NumAZs: "3"
   Azure:
      AZ0: "0"
      AZ1: "1"
      AZ2: "2"
      Name: Oregon
      NumAZs: "3"

Metadata:
   Project:
      - Label:
         Name:
         Parameters:
            - Environment
            - ArtifactRepository
            - Id
            - RetryLimit
            - DistributedEnvironmentEnabled
            - DataMapId
            - Secrets
BuildParameters:
  ArtifactoryEndpoint:
    Default:
    Description: Artifactory endpoint
    Type: String
```

FIG. 6

SELF-HEALING BUILD PIPELINES FOR AN APPLICATION BUILD PROCESS ACROSS DISTRIBUTED COMPUTER PLATFORMS

TECHNICAL FIELD

One or more implementations relate to the field of software application development; and more specifically, to self-healing build pipelines for an application build process across distributed computer platforms.

BACKGROUND ART

Software application deployment can be challenging, especially, for a large enterprise that employs numerous testing, staging and production environments or when developing a very large application that requires extensive computing power. During the process, developers write code for a given requirement and the developers run and test the code on their local computers. Once local coding and testing are complete, the code is integrated within a main version control repository so that all the code written by all the developers can be built in a single build.

Building a very large application program for a software release is typically performed by a software build or build pipeline that allows developers to compile, build, and deplore their code to a production compute platform. During the software build, source code files are compiled and build artifacts are created, such as binaries or executable programs and the like. When extensive computing power is required, the build may be performed across a distributed system, such as a cloud computing platform. One challenge is that if one computer used in the distributed platform fails, the whole build process is started again from the beginning. This can be an implicit problem with public clouds (e.g., Amazon Web Services (AWS)™ and Microsoft Azure™) where virtual machines can fail easily. To avoid this problem, the developer can reserve virtual machine instances on the public cloud, but this in turn comes at a high cost.

Some existing build technologies may refer to a self-healing build process, but the so-called self-healing build processes are platform dependent and the definition of self-healing is to recreate the entire build process using resiliency models. This means the entire build process consumes an equivalent amount of resources similar to the previous failed runs, which increases operational costs, compute resources and network overhead.

There is a need therefore, for a self-healing build pipeline across a distributed computer platform that avoids recreating the build process during a build pipeline failure.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4 is a diagram illustrating contents of the decentralized database in accordance with one implementation.

FIG. 6 is a diagram illustrating configuration data consumed during an onboarding process by the public API.

DETAILED DESCRIPTION

The following description describes implementations for self-healing build pipelines for an application build process across distributed computer platforms. The disclosed implementations provide an API architecture that isolates platform dependency issues during a build process and provides flexibility for build pipelines to stabilize the build processes across distributed (cloud) environments using on-boarded data, APIs and a decentralized database.

Figure 1:
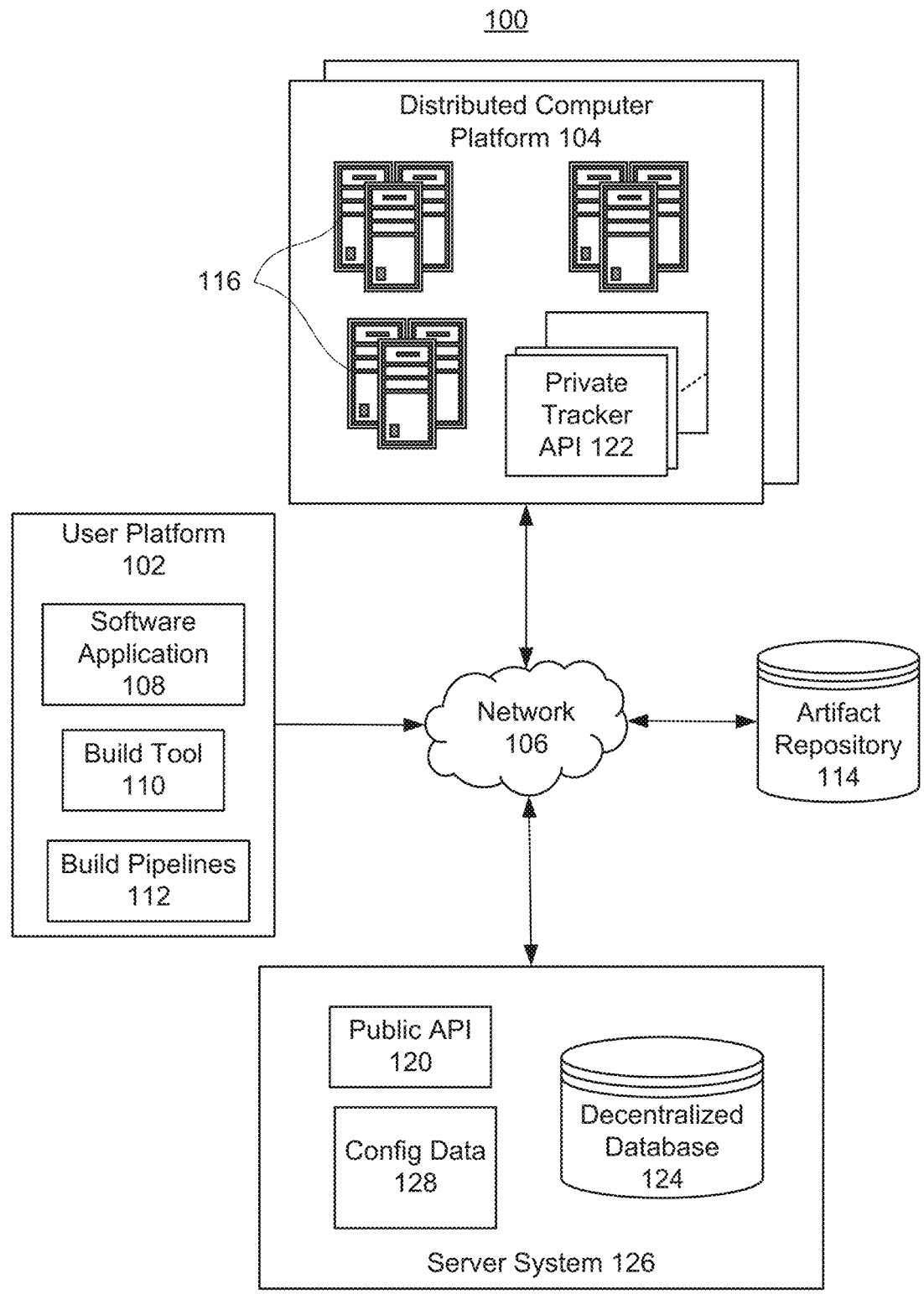
FIG. 1 illustrates a system for implementing self-healing build pipelines for an application build process across distributed computer platforms.

FIG. 1 illustrates a system for implementing self-healing build pipelines for an application build process across distributed computer platforms. The system 100 comprises a user platform 102 and one or more distributed computer platforms 104 in communication over a network 106, such as the Internet. The network 106 comprises one or more arrangements of the type known in the art, e.g., local area networks (LANs), wide area networks (WANs), metropolitan area networks (MANs), and or Internet(s).

The user platform 102 may represent a deployment environment for staging a software application 108 during a development life cycle from the development environment to a production environment. The user platform 102 may comprise one or more servers, workstations, minicomputers, mainframes or other digital data processing devices suitable for supporting production, testing, staging and/or other deployment environments. The user platform 102 may support many software developers who write many different modules comprising the software application 108. Once the developers are finished writing the code and run the tests on their local computer, they can integrate the code within a main version control repository so that all the work done by all the developers can be built in single build.

The process of building software application 108 may be managed by a build tool 110, which is a program that compiles source code, creates a package, and installs the package in a repository (not shown). Examples of commercially available build tools include MAKE, GRADLE, MEISTER, ANT, MAVEN, RAKE, SCONS and PHING.

The build tool 110 may utilize one or more build pipelines 112, which is a set of automated processes that allow developers to compile, build, and deploy their code to their production platforms. The most common components of a build pipeline may include build automation/continuous integration, test automation, and deploy automation. The build pipelines 112 typically includes one or more stages and each stage can have one or more jobs. A job is a series of steps or tasks that perform an action, such as invoking a REST API or publishing a build artifact.

An artifact is a collection of files or packages that are made available to subsequent tasks, such as distribution or deployment. An artifact may comprise project source code, dependencies, binaries or resources. During a software build, artifacts are usually stored in an artifact repository 114 so they can be retrieved on demand and shared across teams. The artifact repository 114 stores binary artifacts along with associated metadata in a defined directory structure, similar to a source code repository. The metadata describes the binary artifact and includes information such as dependencies, versioning, and build promotions. Metadata accumulated about the artifacts is used for reusing the code and improving the build process.

In the implementation shown, the artifact repository 114 may be located remote from the user platform 102. However, additionally or alternatively, the artifact repository 114 may be located within the user platform, in the distributed computer platform 104 or elsewhere. Examples of commercially available artifact repositories include Jfrog Artifactory™ and Sonatype Nexus Repository OSS™. The Sonatype Nexus Repository OSS is an example of an open-source artifact repository that supports the repositories of Linux distributions and tools of development languages, such as Pypi, Npmjs, Maven and Gradle, and the like. To support customers to build the artifact repository, Amazon Web Services™ offers the Nexus Repository OSS so users can deploy a Sonatype Nexus Repository OSS in their Amazon Web Services private network.

A build pipeline 112 can deploy to one or more environments. For example, in one implementation, the build process is performed on the distributed computer platform 104. The distributed computer platform 104 may comprise distributed computing clusters having a plurality of servers 116, storage devices and software used to host an application or service, or any technology on which other technologies are built in multi-cloud and hybrid cloud environments. Commercially available distributed computer platforms 104 may include public cloud platforms such as Amazon Web Services (AWS)™, Google Cloud Platform (GCP)™ and Microsoft Azure™ for example. The distributed computer platform 104 may provide scalable computing capacity in which users can launch as many or as few servers 116 as they need, configure security and networking, and manage storage. Virtual computing environments, known as instances, may be provided along with various configurations of CPU, memory, storage, and networking capacity for each user's instances, known as instance types. An example of such an environment is Amazon Elastic Compute Cloud™ (Amazon EC2), which provides scalable computing capacity in the AWS cloud.

One challenge during the build process is that if one computer used in the distributed computing platform 104 fails, the whole build process is typically started again from the beginning. This is an implicit problem with public clouds where virtual machines can fail easily. Some existing build technologies may refer to a self-healing build process, but the so-called self-healing build processes are platform dependent and the definition of self-healing is to recreate the entire build process using resiliency models. This means the entire build process consumes an equivalent amount of resources similar to the previous failed runs, which increases operational costs, compute resources and network overhead.

According to the disclosed implementations, a self-healing build pipeline across distributed computer platforms architecture is provided that avoids recreating the build process during a build pipeline failure. This is accomplished through use of an application programming interface (API) architecture comprising a public API 120, one or more instances of a private tracker API 122 and a decentralized database 124.

The public API 120 performs onboarding of configuration data describing the build job, stores the configuration data in the decentralized database 124, serves requests to/from the pipeline tracker API 122, and stores states of build pipelines 112 during the build.

In some implementations, the decentralized database 124 is a database in which data is stored across different physical locations. The decentralized database 124 may be stored in multiple computers located in the same physical location; or may be dispersed over a network of interconnected computers. The decentralized database 124 stores the configuration data (e.g., raw metadata) and a unique project identifier for the build, as well as processed metadata regarding states of the build pipelines 112 collected across the distributed computer platform 104 by the private tracker API, which relays the collected metadata to the public API 120.

The pipeline tracker APIs 122 run local to the build environment in the distributed computer platform 104. The pipeline tracker API 122 sends the progress of the build status to public API 120 for updating the decentralized database 124. For any failures in the build processes due to environment issues, the pipeline tracker API 122 recovers the state based on the unique project identifier from decentralize database 124 and triggers a new build pipeline 112 locally that resumes from the failed state to provide a self-healing build pipeline architecture. Once multiple failures occur and a predefined number of retry attempts have been exhausted, the pipeline tracker 122 sends a request to public API 120 to find another distributed computer platform 104 in which to trigger the new build pipeline 112. During this process, the API architecture that avoids the need for manual intervention and enables self-healing build pipelines.

The API architecture provides a gateway to leverage spot instances (using spare cloud processing capacity) for the build process, which are cost efficient. Storing the state of the build pipelines 112 in the decentralized database 124 and triggering a new build pipeline from a failed state makes the build process run faster and more efficiently, as well as results in a significant cost saving when using public cloud environments. Thus, the API architecture isolates distributed computer platform 104 dependency issues during the build process and provides flexibility for build pipelines 112 to stabilize the build processes across distributed (cloud) environments.

Figure 2:
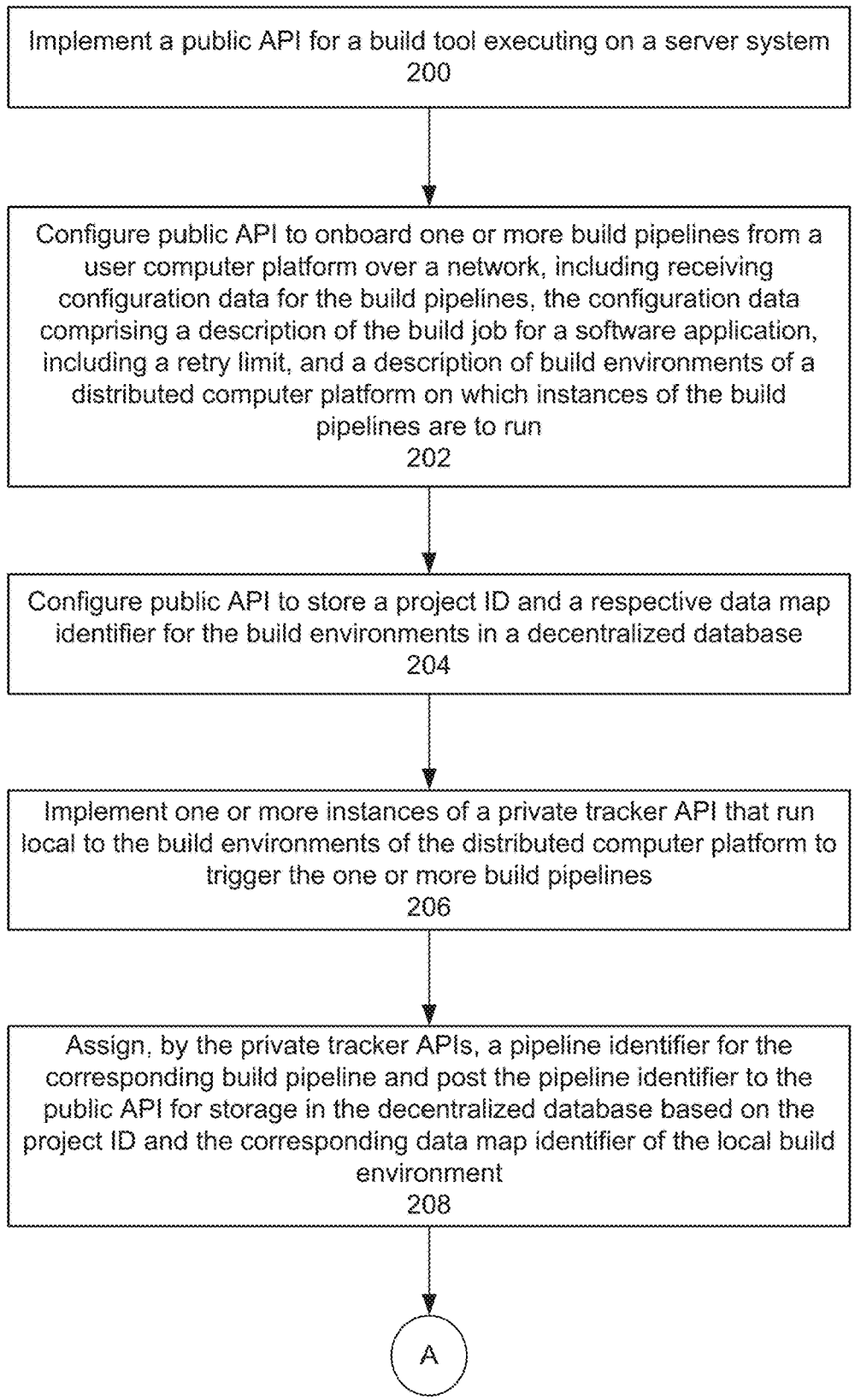
FIG. 2 is a flow diagram of a process for implementing self-healing build pipelines for an application build process across a distributed computer platform according to one implementation.
Figure 2:
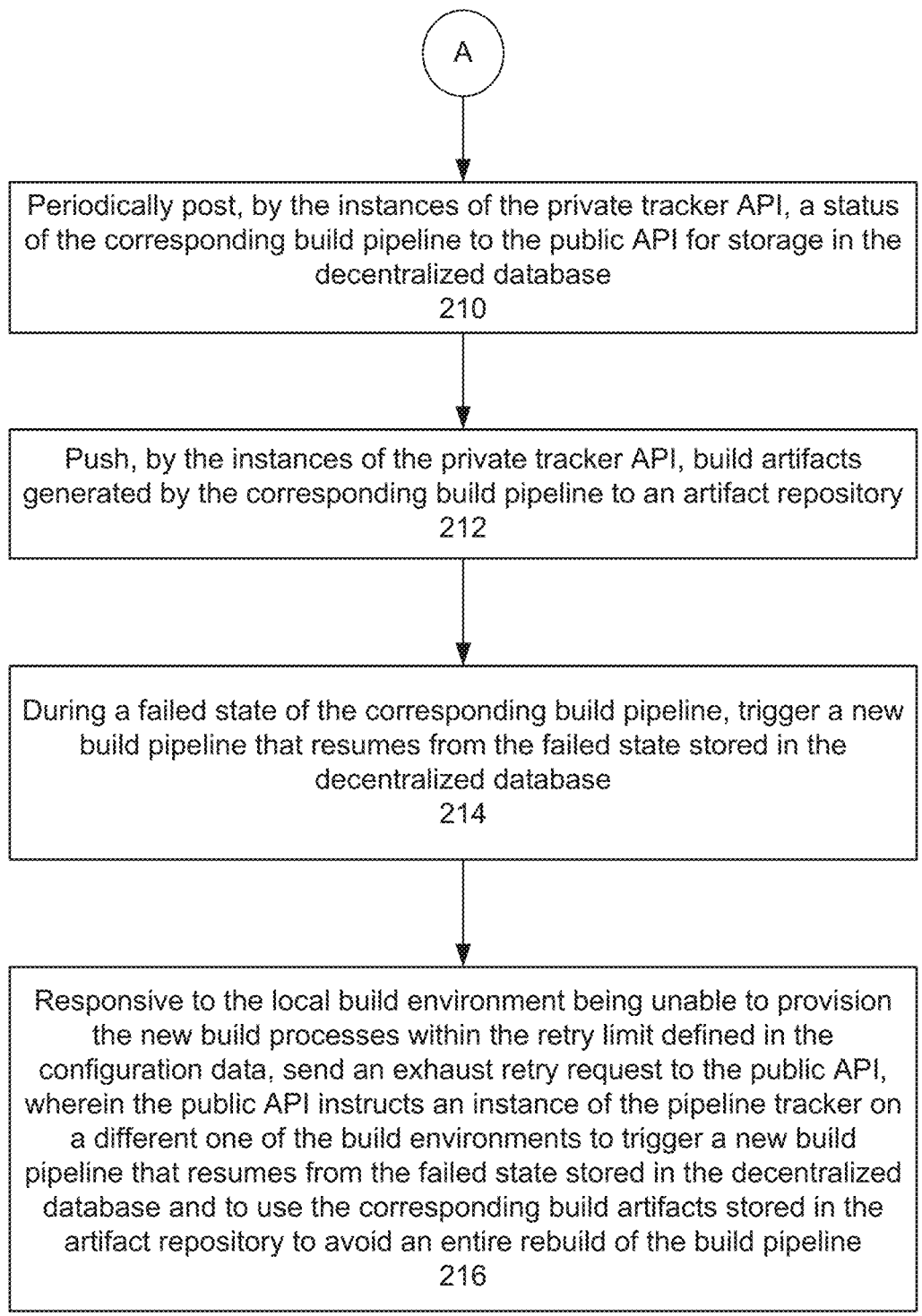

FIG. 2 is a flow diagram of a process for implementing self-healing build pipelines for the application build process across a distributed computer platform according to one implementation.

Referring to both FIGS. 1 and 2, the process may include implementing a public API 120 for a build tool 112, where the public API 120 executes on a server system 126 having one or more processors, (block 200). In one implementation, the server system 126 may communicate over network 106 with the user platform 102 and the distributed computer platform 104 over the network 106. Additionally or alternatively, the server system 126 may be part of the user platform 102 or the distributed computer platform 104.

The public API 120 is capable of being configured to onboard one or more build pipelines 112 from a user platform 102, including receiving configuration data 128 for the build pipelines 112, where the configuration data 128 comprises a description of the build job for software application 108, including a retry limit, and a description of build environments of the distributed computer platform 104 on which instances of the build pipelines 112 are to run, (block 202).

The public API 120 is further configured to store a project ID, and a respective data map identifier for the build environments in a decentralized database 124 (block 204).

The process further includes implementing one or more instances of a private tracker API 122 that run local to the build environments of the distributed computer platform to trigger the one or more build pipelines (block 206).

The instances of the private tracker API are capable of being configured to assign/generate a pipeline identifier for the corresponding build pipelines and post the pipeline identifiers to the public API for storage in the decentralized database based on the project ID and the corresponding data map identifier of the local build environment (block 208).

The instances of the private tracker API periodically post a status of the corresponding build pipeline to the public API for storage in the decentralized database (block 210). The instances of the private tracker API further push build artifacts generated by the corresponding build pipeline to an artifact repository (block 212), and during a failed state of the corresponding build pipeline, trigger a new build pipeline that resumes from the failed state stored in the decentralized database (block 214). As used herein, triggering a new pipeline may also mean retrying or be triggering the failed build pipeline resuming from the failed state. In one implementation, the private tracker API may send a request to the public API to trigger the new build pipeline.

Responsive to the local build environment being unable to provision the new build pipeline within the retry limit defined in the configuration data, the instance of public tracker API sends an exhaust retry request to the public API, wherein the public API instructs an instance of the pipeline tracker on a different one of the build environments to trigger a new build pipeline that resumes from the failed state stored in the decentralized database and to use the corresponding build artifacts stored in the artifact repository to avoid an entire rebuild of the build pipeline (block 216). For example, assuming a developer is building the software application on AWS and during the build process one of the spot instance machine fails, the build process can resume from a different spot instance machine beginning where the other spot instance failed.

According to the disclosed implementations, a self-healing build pipeline and API architecture provide several advantages. One advantage is that the architecture optimizes the Cost To Serve and operational overhead by eliminating the need of recreating new pipelines from scratch on failures and creates an opportunity for cost savings in using public clouds. The architecture also provides immutability in the build environment (this helps in security and artifact signing) and eliminates the need of persistent heavy build-environments. Pushing and saving artifacts in a decentralized fashion solves complexities with concurrency at scale. The API architecture ensures the success ratio for build pipelines by establishing connectivity across distributed systems using on-boarded data.

Figure 3:
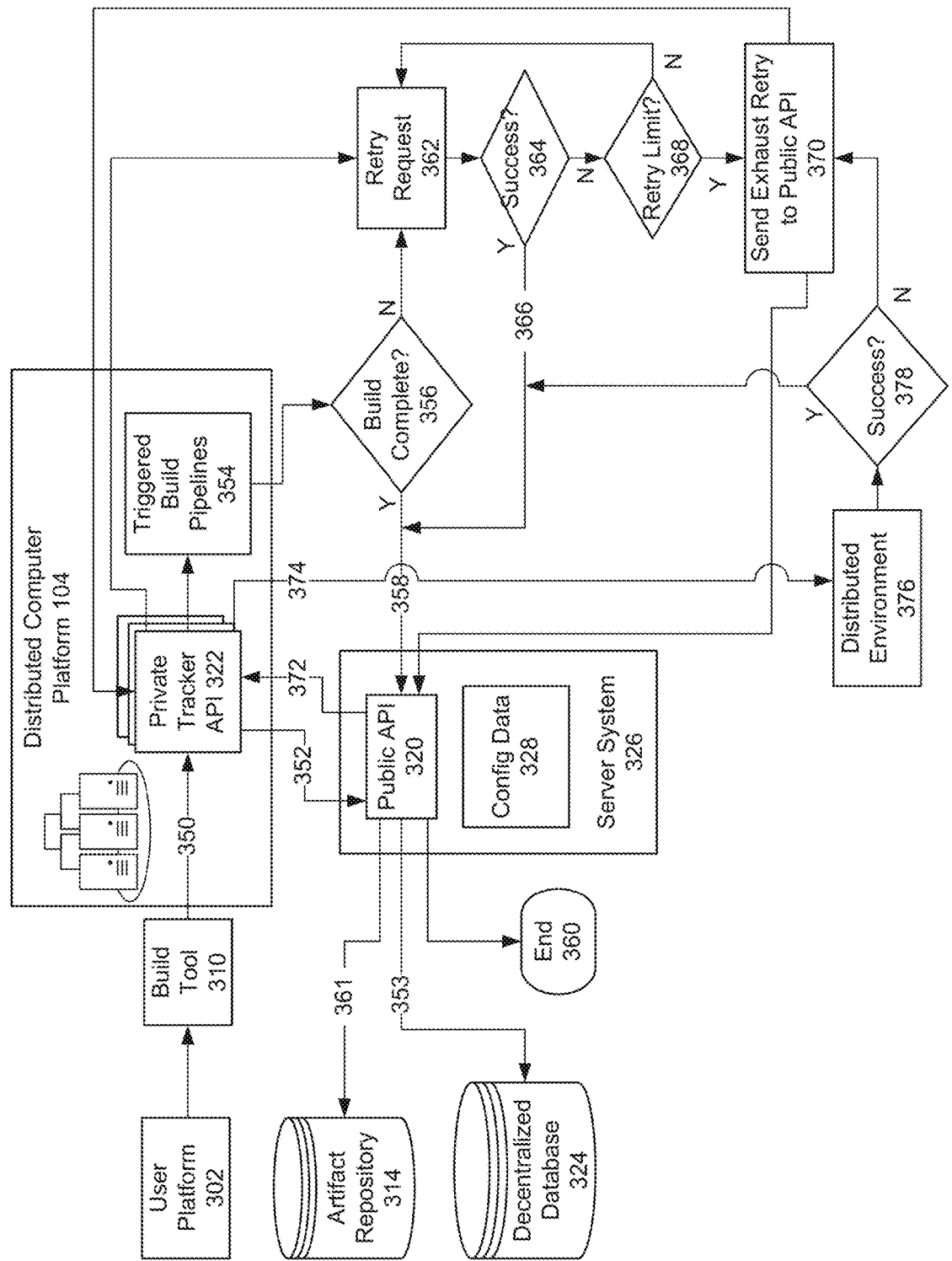
FIG. 3 is a flow diagram showing further details of a process for implementing self-healing build pipelines for the application build process across distributed computer platforms according to one implementation.

FIG. 3 is a flow diagram showing further details of a process for implementing self-healing build pipelines for the application build process across a distributed computer platform according to one implementation.

The process may begin by user platform 302 submitting a build job through the build tool 310 to the distributed computer platform 204 (line 350). According to the disclosed implementations, a private tracker API 322 and the public API 320 are used to control the build job and recover from a failed state. The private tracker API 322 receives onboarding information in the form of configuration data 328 for the build job and relays the configuration data to the public API 320 (line 352). As described above, the configuration data 328 may include a description of the build project, and a retry limit. The private tracker API 322 also assigns and sends to the public API 320 a project identifier (ID) to the build job, a data map identifier for each designated build environments, and a respective pipeline ID for each designated build pipeline.

The public API 320 stores the configuration data 328 in the decentralized database 324 (block 353). The build pipelines are triggered (block 354) to run on the spot instances of the distributed computer platform 104 either by the build tool through 310 or the private tracker API 322. If the build tool 310 signals that the build job completed successfully (block 356), the private tracker API 322 sends a success message to the public API 320 (line 358). The public API 320 then updates the decentralized database 324 with a status of build pipelines (line 353), pushes any build artifacts generated by the build pipelines to the artifact repository 314 (line 361), and the process the ends (block 360).

If the build tool 310 indicates that one of build pipelines failed, the private tracker API 322 sends a retry signal to trigger a new build pipeline within the local build environment (e.g., the machine instance) starting from a stage that the build pipeline failed (block 362). In one implementation, the public API 320 may send the retry signal.

If the new build pipeline completes successfully (block 364), the private tracker API 322 sends a success message to the public API 320 (lines 366/358) along with a pipeline ID of the new build pipeline to the public API 320. The public API 320 then updates the decentralized database 324 based on the corresponding project ID, pipeline ID and data map ID of the build environment (line 353), pushes/posts any generated artifacts to the artifact repository 314 (line 361), and the process ends (block 360).

If the new build pipeline fails again, e.g., the local build environment is unable to provision the new build pipeline (block 364), the private tracker API 322 may resend the retry request 362 to trigger the new build pipeline as long as the retry limit has not been exceeded (block 368). In one implementation, the private tracker API 322 may determine what the retry limit is by requesting the public API 320 to fetch the retry limit from the decentralized database. Additionally or alternatively, the private tracker API 322 may send the number of attempted retries to the public API 320, which may then compare the attempted number of retries with the retry limit stored in the decentralized database and provide a result to the private tracker API 322.

If the retry limit has been reached (block 368), the API architecture of the disclosed implementation makes another attempt at salvaging the build job by configuring the private tracker API 322 to send an exhaust retry signal to the public API 320 (block 370). Upon receipt, the exhaust retry signal informs the public API 320 that retry attempts have been exhausted on the local build environment and to search the decentralized database 324 to find a different one of the build environments on which to resume the build.

The public API 320 then sends a retry initiative signal with the ID of the new build environment to the private tracker API 322 (line 372). One reason the public API 320 resides outside of the private distributed computer platform 104 is to have access to the decentralized database 324 that may include information about other cloud providers and available build environments (e.g., AWS, GCP and the like). Upon the same or different instance of the private tracker API 322 receiving the retry initiative signal, the private tracker API 322 sends a signal to trigger the new build pipeline on the new distributed environment 376 along with recover state information so that the new build pipeline starts from the failed stage of the failed pipeline (line 374). In one implementation, the distributed environment 376 is different from the distributed computer platform 104, but could be the same.

If the new build pipeline also fails (block 378), the process continues by sending another exhaust retry to the public API (block 370) and the process continues with the public API 320 searching the decentralized database 324 to find another build environment on which to resume the build. If the new build pipeline completes successfully (block 378), the process continues as described above where the private tracker API 322 may send a pipeline ID of the new build pipeline to the public API 320 to update the decentralized database 324 based on the corresponding pipeline ID and data map identifier of the build environment (line 353), any artifacts generated are pushed to the artifact repository 314 (line 361), and the process ends (block 360).

FIG. 4 is a diagram illustrating contents of the decentralized database in accordance with one implementation. The decentralized database 400 stores information that may be gathered during the onboarding process. The decentralized database 400 may be implemented as one or more tables. The decentralized database 400 includes values for parameters including a project ID 402 and an associated data map identifier 404. The project ID 402 is assigned to each project to identify the particular project, and the associated data map identifier 404 is used by the API architecture in the end-to-end flow of the build execution.

Other parameters may include build job 406, pipeline ID 408, pipeline status 410, distributed environment 412, retry limit 414, pipeline execution time 416, project name 418, submission ID 420, and an artifact repository ID 422.

The parameters provided during the onboarding process that describe the build job and build environment of the distributed computer platform 104 may include the build job 406, project name 418, distributed environment 412, the retry limit 414, and the artifact repository ID 422. The build job 406 and project name 418 may store the build job name (e.g., Apache, Tomcat, etc.) and the project name (e.g., Apache Build, Tomcat Build, etc.), respectively. The distributed environment 412 stores the name of the distributed computer platform 104 (e.g., AWS, GCP, Azure, etc.). The retry limit 414 specifies the number of times a failed job should be retried (e.g., 1, 2, 3 . . . ).

Other parameters stored in the decentralized database 400 include a submission request ID 420 that identifies the build pipeline that generated a particular artifact, and the artifact repository ID 422 where artifacts are stored (e.g., Nexus, Jfrog, etc.).

Once the build pipelines are triggered during build execution, the public API 320 may directly update the decentralized database 400. For example, for the build pipeline identified by the pipeline ID 408, the public API 320 may: i) update the pipeline status 410 with the actual status of "Success," "Retry," or "Retry Exhaust"; and ii) update the pipeline execution time 416 with the actual execution time of the build pipeline.

As shown in the example, the decentralized database 400 stores data for two build jobs, Apache and Tomcat, where the Apache build job completed successfully within an execution time a 15 minutes. The Tomcat build job needed to issue two retry exhaust requests, meaning the failed build pipeline needed to be retriggered on two different environments before the build job reached a successful completion.

According to the disclosed implementations, the decentralized database 400 is used to disassociate persistent information that maps to the build environment of the distributed computer platform 104. This persistent information is removed from the distributed computer platform 104 and stored in the external decentralized database 400 to provide an API architecture that is flexible enough to navigate across multiple cloud platforms. This enables self-healing build pipelines by retrieving the data in the decentralized database 400 along with storing and retrieving build artifacts in the artifact repository 314. Accordingly, API architecture enables users to choose whether to have a build job performed on a single distributed computer platform, multiple distributed computing platforms, and hybrid platforms.

Artifact Push Mechanism and Naming Mechanism

The artifact repository 114 saves build artifacts generated by different developers using different computers/servers. An artifact push mechanism and naming mechanism are provided that ensures that when a new build pipeline is triggered on a new environment or machine after a build failure, that only the artifacts associated with the failed job are moved to the new build pipeline on the new machine.

Figure 5:
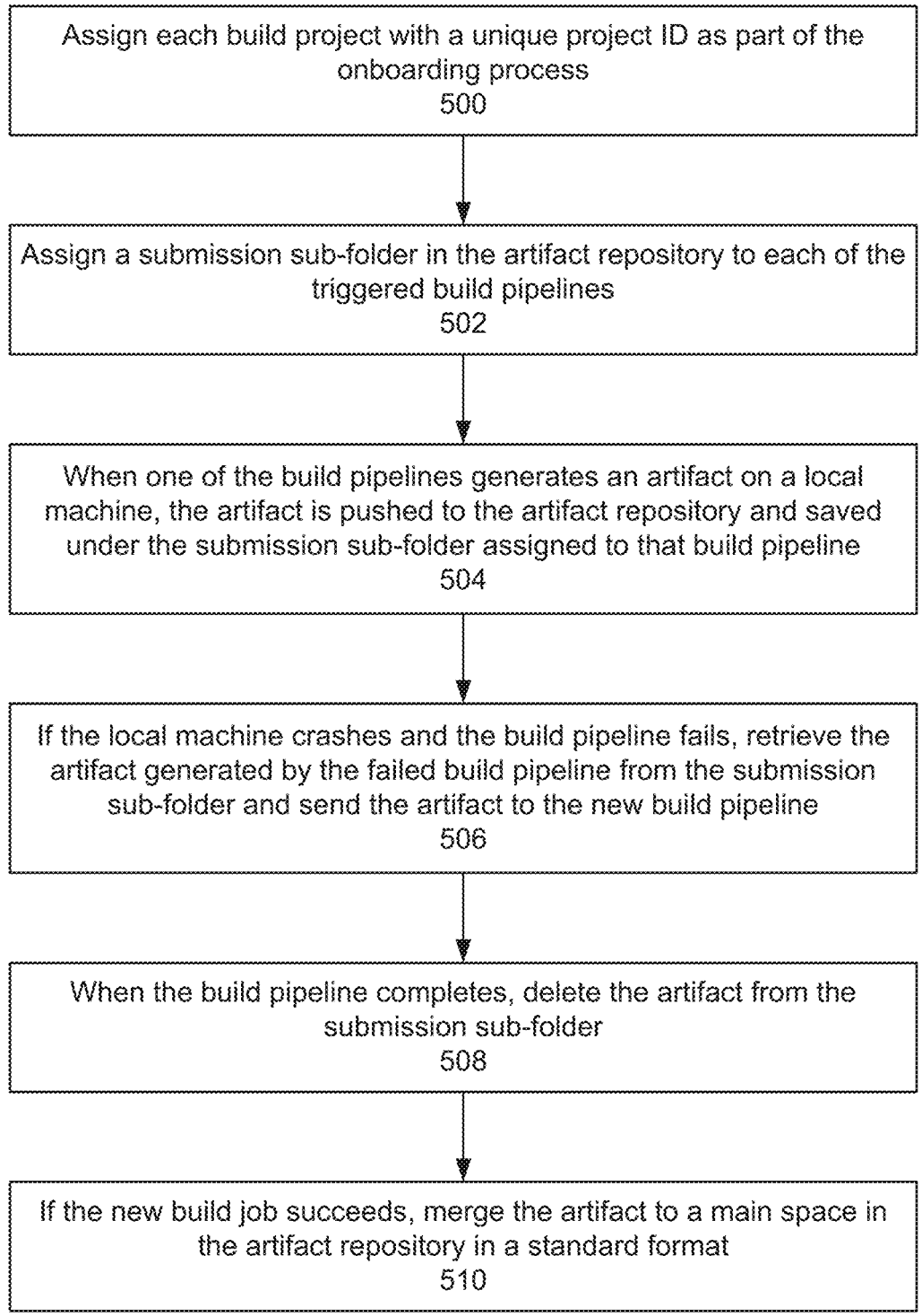
FIG. 5 is a flow diagram showing a process performed by the public API for artifact naming to support self-healing build pipelines during onboarding.

FIG. 5 is a flow diagram showing a process performed by the public API for artifact naming to support self-healing build pipelines in a distributed computer environment during onboarding. The process may begin by assigning each build project with a unique project ID 402 as part of the onboarding process (block 500). The project ID 402 and submission ID 420 will also be used during subsequent artifact generation by the build pipelines throughout the lifecycle of the build job.

A submission sub-folder in the artifact repository 114/314 is assigned to each of the triggered build pipelines 354 (block 502). In one implementation, the name of the folder is a submission request ID 420 (see FIG. 4) to identify the build pipeline 354 that generated a particular artifact.

When one of the triggered build pipeline 354 generates an artifact on a local machine, the artifact is pushed to the artifact repository and saved under the submission sub-folder assigned to that build pipeline 354 (block 504). In one example implementation, the artifacts may be named using a naming convention of <Major.Minor.e-release-SubmissionId-Snapshot>.

If the local machine crashes, the artifact generated by the failed build pipeline is retrieved from the submission sub-folder and the artifact is sent to the new build pipeline, rather than building those again from scratch (block 506). In one embodiment, the request to pull the generated artifacts may be done using data map ID 404, the pipeline ID 408, the submission ID, or a combination thereof.

When the build pipeline completes, all the artifacts stored in the submission sub-folder are deleted from the submission sub-folder (block 508). This ensures money is saved on storage, improves build speed, and ensures persistent data is maintained and made available from one build machine to another.

If the new build job succeeds, the artifacts are merged to a main space in the artifact repository in a standard format for sharing with others (block 510).

FIG. 6 is a diagram illustrating that the configuration data 600 may be in YAML format and consumed during the onboarding process by the public API 120/320. The configuration data 600 includes distributed environment mappings that are used by the public API 120/320 to populate the decentralized database 324. In this particular example, distributed environment mappings define three distributed computer platforms/environments: AWS, GCP and Azure. The AWS and Azure environments include three machines, while the GCP environment defines two machines. The build job 406 and/or project name 418 is "Oregon", and the artifact repository is set to "Default." The configuration data 600 may include other information such as dependencies on other external modules and components, build order, directories, and any required plug-ins, for instance.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
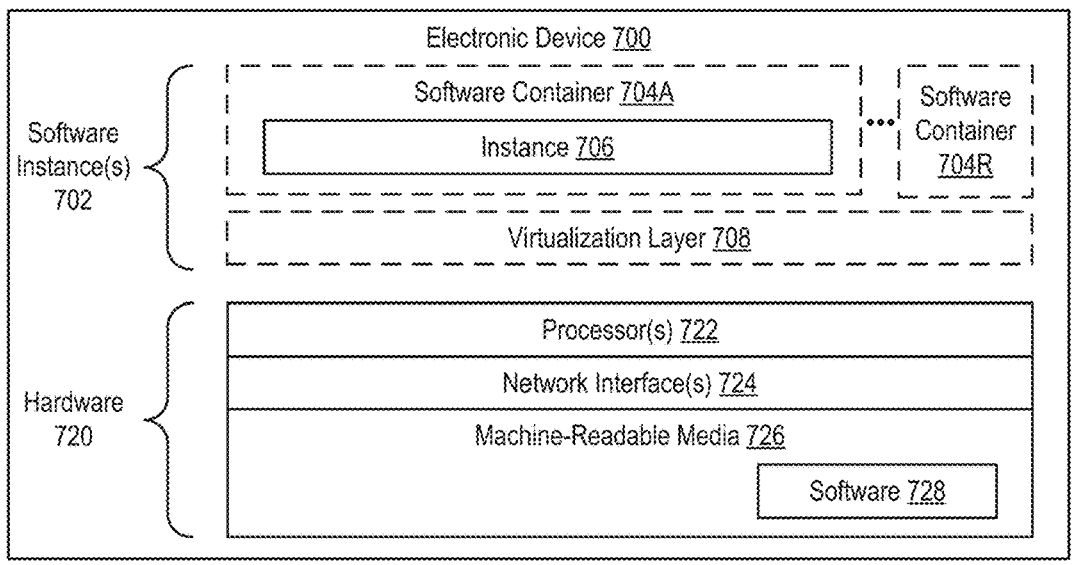
FIG. 7A is a block diagram illustrating an electronic device according to some example implementations.
Figure 7B:
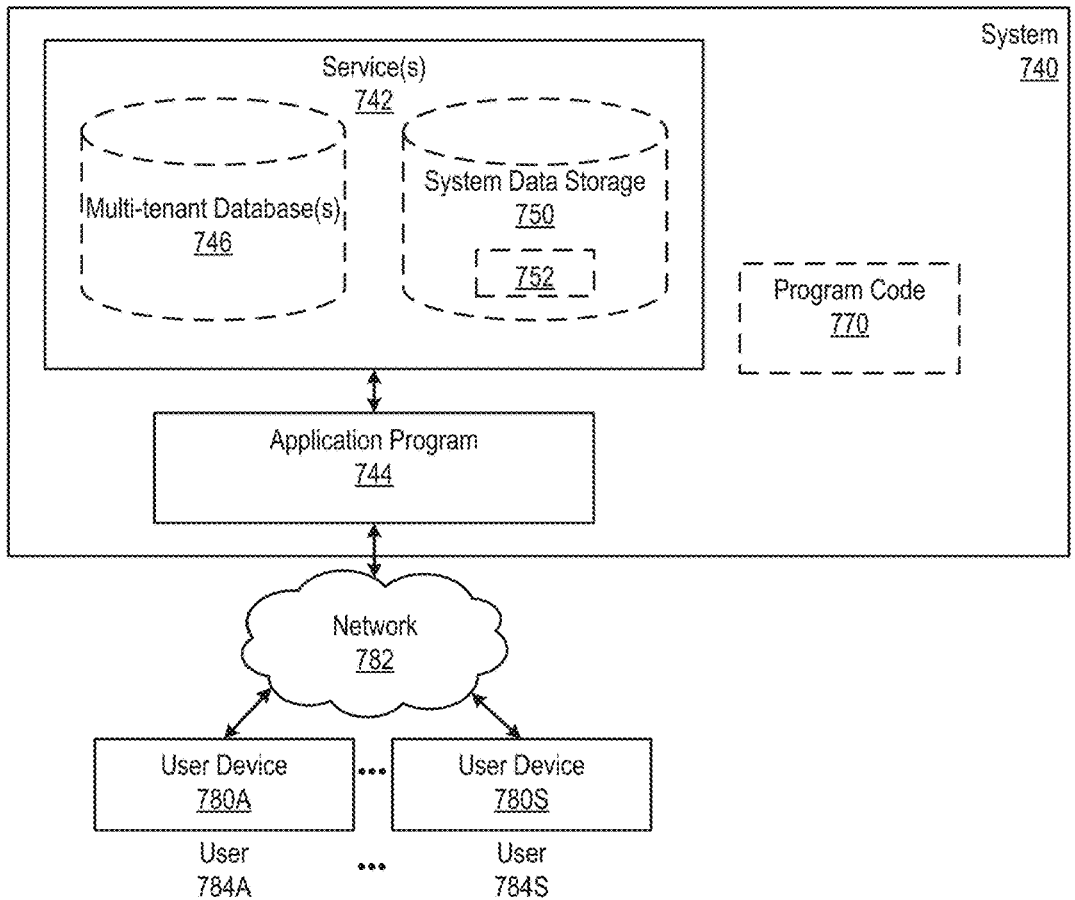
FIG. 7B is a block diagram of a deployment environment according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include nontransitory and/or transitory machine-readable media. Each of the previously described clients and the self-healing build pipeline service may be implemented in one or more electronic devices 700. In one implementation: 1) each of the clients is implemented in a separate one of the electronic devices 700 (e.g., in end user devices where the software 728 represents the software to implement clients to interface directly and/or indirectly with the self-healing build pipeline service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the self-healing build pipeline service is implemented in a separate set of one or more of the electronic devices 700 (e.g., a set of one or more server devices where the software 728 represents the software to implement the self-healing build pipeline service); and 3) in operation, the electronic devices implementing the clients and the self-healing build pipeline service would be communicatively coupled (e.g., by a network) and would establish between them (or through one or more other layers and/or or other services) connections for submitting configuration data to the self-healing build pipeline service and returning a software package to the clients. Other configurations of electronic devices may be used in other implementations (e.g., an implementation in which the client and the self-healing build pipeline service are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Example Environment

FIG. 3B is a block diagram of a deployment environment according to some example implementations. A system 740 includes hardware (e.g., a set of one or more server devices) and software to provide service(s) 742, including the self-healing build pipeline service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multitenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multitenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Self-Healing Build Pipeline service 742; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multitenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the self-healing build pipeline service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
   implementing a public application programming interface (API) for a build tool, the public API executing on one or more processors and capable of being configured to:
      onboard one or more build pipelines from a user computer platform, including receiving configuration data for the one or more build pipelines, the configuration data comprising a description of a build job for a software application, including a retry limit, and a description of build environments of a distributed computer platform on which instances of the one or more build pipelines are to run, and
      store a respective data map identifier for the build environments in a decentralized database; and
   implementing one or more instances of a private tracker API that run local to the build environments of the distributed computer platform, the one or more instances of the private tracker API capable of being configured to:
   assign a pipeline identifier for the one or more build pipelines and post the pipeline identifier to the public API for storage in the decentralized database based on the data map identifier of the build environments;
   periodically post a status of the one or more build pipelines to the public API for storage in the decentralized database;
   push build artifacts generated by the one or more build pipelines to an artifact repository;
   during a failed state of the one or more build pipelines, trigger a new build pipeline that resumes from the failed state stored in the decentralized data-base; and
   responsive to the one or more build environments being unable to provision the new build pipeline within the retry limit defined in the configuration data, send an exhaust retry request to the public API,
   wherein the public API instructs the one or more instances of the pipeline tracker API on a different one or more build environments to trigger the new build pipe-line that resumes from the failed state stored in the decentralized database and to use the build artifacts stored in the artifact repository to avoid an entire rebuild of the one or more build pipelines.

2. The method of claim 1, further comprising: configuring the one or more instances of the private tracker API to:
   receive the configuration data for the build job;
   assign a project identifier for the build job;
   assign the respective data map identifier for the build environments; and
   relay the configuration data to the public API.

3. The method of claim 1, wherein trigger the new build pipeline further comprises: trigger the one or more build pipelines, by the instances of the private tracker API, to run on spot instances of the distributed computer platform, and if the build job completes successfully, sending a success message to the public API along with a pipeline identifier of the new build pipeline.

4. The method of claim 3, further comprising the public API updating the decentralized database based on the corresponding pipeline identifier and the data map identifier of the build environment, and pushing any generated artifacts to the artifact repository.

5. The method of claim 1, wherein responsive to the one or more build environment being unable to provision the new build pipeline further comprises: determining, by the instances of the private tracker API what the retry limit is by requesting the public API, to fetch the retry limit from the decentralized database.

6. The method of claim 1, wherein responsive to the one or more build environments being unable to provision the new build pipeline further comprises: sending, by the one or more instances of the private tracker API, a number of attempted retries to the public API, which then compares the attempted number of retries to the retry limit stored in the decentralized database and provides a result to the private tracker API.

7. The method of claim 1, wherein responsive to the one or more build environments being unable to provision the new build pipeline and the retry limit has been reached further comprises: configuring the private tracker API to send an exhaust retry signal to the public API that informs the public API that retry attempts have been exhausted on the one or more build environment and to search the decentralized database to find a different one or more build environments on which to resume triggering the new build pipeline.

8. The method of claim 7, further comprising: responsive to the new build pipeline on the different one or more build environments failing, send another exhaust retry to the public API for the public API to search the decentralized database to find another of the one or more build environments on which to resume the new build pipeline.

9. The method of claim 1, further comprising: once the one or more build pipelines are triggered during build execution, directly updating, by the public API, the decentralized database by: i) updating a pipeline status with a status of "Success," "Retry," or "Retry Exhaust"; and ii) updating a pipeline execution time with an actual execution time of the corresponding build pipeline.

10. A non-transitory machine-readable storage medium that provides instructions that, if executed by a processor, are configurable to cause said processor to perform operations comprising:
implement a public application programming interface (API) for a build tool, the public API executing on one or more processors and capable of being configured to:
onboard one or more build pipelines from a user computer platform, including receiving configuration data for the one or more build pipelines, the configuration data comprising a description of a build job for a software application, including a retry limit, and a description of build environments of a distributed computer platform on which instances of the one or more build pipelines are to run, and implement one or more instances of a private tracker API that run local to the build environments of the distributed computer platform, the one or more instances of the private tracker API capable of being configured to:
periodically post a status of the one or more build pipelines to the public API for storage in a decentralized database;
push build artifacts generated by the one or more build pipelines to an artifact repository;
during a failed state of the one or more build pipelines, triggering a new build pipeline that resumes from the failed state stored in the decentralized database; and
responsive to the one or more build environments being unable to provision the new build pipeline within the retry limit defined in the configuration data, send an exhaust retry request to the public API,
wherein the public API instructs the one or more instances of the pipeline tracker API on a different one or more build environments to trigger the new build pipeline that resumes from the failed state stored in the decentralized database and to use the corresponding build artifacts stored in the artifact repository to avoid an entire rebuild of the one or more build pipelines.

11. The non-transitory machine-readable storage medium of claim 10, further comprising: configuring the public API to: assign a respective submission sub-folder in the artifact repository for a first build pipe-line; and when the first build pipeline generates an artifact on a local machine, save the artifact under the submission sub-folder assigned to the first build pipeline in the artifact repository.

12. The non-transitory machine-readable storage medium of claim 11, further comprising: configuring the public API to: if the first build pipeline fails, retrieve the artifact generated by the first build pipeline from the submission sub-folder and send the artifact to the new build pipeline; and when the build pipeline completes, delete the artifact from the submission sub-folder.

13. The non-transitory machine-readable storage medium of claim 12, further comprising: configuring the public API to:
if the new build job succeeds, merge the artifact to a main space in the artifact repository in a standard format.

14. The non-transitory machine-readable storage medium of claim 10, further comprising: configuring the one or more instances of the private tracker API to:
receive the configuration data for the build job;
assign a pipeline identifier for the corresponding build pipeline;
assign a project identifier for the build job;
assign a respective data map identifier for the build environments; and
relay the configuration data, the pipeline identifier, the project identifier, and the respective data map identifiers to the public API for the onboarding.

15. The non-transitory machine-readable storage medium of claim 14, wherein trigger the new build pipeline further comprises: trigger the build pipelines, by the instances of the private tracker API, to run on spot instances of the distributed computer platform, and if the build job completes successfully, sending a success message to the public API along with a pipeline identifier of the new build pipeline.

16. The non-transitory machine-readable storage medium of claim 15, further comprising the public API updating the decentralized database based on the corresponding pipeline identifier and the data map identifier of the build environment, and pushing any generated artifacts to the artifact repository.

17. The non-transitory machine-readable storage medium of claim 10, wherein responsive to the one or more build environment being unable to provision the new build pipeline further comprises: sending, by the one or more instances of the private tracker API, a number of attempted retries to the public API, which then compares the attempted number of retries to the retry limit stored in the decentralized database and provides a result to the private tracker API.

18. The non-transitory machine-readable storage medium of claim 10, wherein responsive to the one or more build environment being unable to provision the new build pipeline and the retry limit has been reached further comprises: configuring the private tracker API to send an exhaust retry signal to the public API that informs the public API that retry attempts have been exhausted on the build environment and to search the decentralized database to find a different one or more build environments on which to resume the new build pipeline.

19. The non-transitory machine-readable storage medium of claim 18, further comprising: responsive to the new build pipeline on the different one or more build environments failing, sending another exhaust retry to the public API for the public API to search the decentralized database to find another of the one or more build environments on which to resume the nre build pipeline.

20. An apparatus comprising:
a processor;
a non-transitory machine-readable storage medium that provides instructions that, if executed by the processor, are configurable to cause the apparatus to perform operations comprising,
implementing a public application programming interface (API) capable of being configured to:
onboard one or more build pipelines from a user computer platform, including receiving configuration data for the one or more build pipelines, the configuration data comprising a description of a build job for a software application, including a retry limit, and a description of build environments of a distributed computer platform on which instances of the one or more build pipelines are to run, and
implementing one or more instances of a private tracker API that run local to the one or more build environments of the distributed computer platform, the one or more instances of the private tracker API capable of being configured to:
periodically post a status of the corresponding one or more build pipelines to the public API for storage in a decentralized database;
push build artifacts generated by the one or more build pipelines to an artifact repository;
during a failed state of the build pipelines, triggering a new build pipeline that resumes from the failed state stored in the decentralized database; and
responsive to the one or more build environments being unable to provision the new build pipeline within the retry limit defined in the configuration data, send an exhaust retry request to the public API,
wherein the public API instructs the one or more instances of the pipeline tracker API on a different one of the or more build environments to trigger a-the new build pipeline that resumes from the failed state stored in the decentralized database and to use the build artifacts stored in the artifact repository to avoid an entire rebuild of the one or more build pipelines.

* * * * *